(12) United States Patent
Maida et al.

(10) Patent No.: US 9,056,785 B2
(45) Date of Patent: Jun. 16, 2015

(54) NANOIMPRINT MOLD-FORMING SYNTHETIC QUARTZ GLASS AND MAKING METHOD

(71) Applicant: Shin-Etsu Chemical Co., Ltd., Tokyo (JP)

(72) Inventors: Shigeru Maida, Joetsu (JP); Hisatoshi Otsuka, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 13/932,685

(22) Filed: Jul. 1, 2013

(65) Prior Publication Data

US 2014/0018229 A1 Jan. 16, 2014

(30) Foreign Application Priority Data

Jul. 10, 2012 (JP) ................. 2012-154525

(51) Int. Cl.
| | |
|---|---|
| C03C 3/06 | (2006.01) |
| C03C 3/04 | (2006.01) |
| B29C 33/38 | (2006.01) |
| C03B 20/00 | (2006.01) |
| C03B 19/14 | (2006.01) |

(52) U.S. Cl.
CPC . *C03C 3/04* (2013.01); *B29C 33/38* (2013.01); *C03B 20/00* (2013.01); *C03C 3/06* (2013.01); *C03B 19/1453* (2013.01); *C03B 2201/07* (2013.01); *C03B 2201/21* (2013.01); *C03B 2201/23* (2013.01); *C03C 2201/23* (2013.01)

(58) Field of Classification Search
CPC ............ C03C 2201/23; C03C 2201/02; C03C 2201/06; C03C 3/06

USPC ........................................................... 501/54
See application file for complete search history.

(56) References Cited

U.S. PATENT DOCUMENTS

| | | | |
|---|---|---|---|
| 7,923,394 B2 * | 4/2011 | Maida et al. ............ | 501/54 |
| 2007/0207911 A1 * | 9/2007 | Koike et al. ............ | 501/54 |
| 2012/0292793 A1 | 11/2012 | Koike et al. | |

FOREIGN PATENT DOCUMENTS

WO 2011/096368 A1 8/2011

OTHER PUBLICATIONS

Agarwal, Anand, et al., "A simple IR spectroscopic method for determing fictive temperature of silica glasses", Journal of Non-Crystalline solids 185, USA, 1995, pp. 191-198.
Khotimchenko, V., S., et al., "Determing the Content of Hydrogen Dissolved in Quartz Glass Using the Methods of Raman Scattering and Mass Spectrometry", 1987, vol. 46, No. 6, pp. 987-991.

* cited by examiner

*Primary Examiner* — Noah Wiese
(74) *Attorney, Agent, or Firm* — Westerman, Hattori, Daniels & Adrian, LLP

(57) ABSTRACT

Synthetic quartz glass is prepared by subjecting a silicon-providing feedstock to flame hydrolysis in oxyhydrogen flame, depositing silica fine particles on a rotating quartz glass target while concurrently melting and vitrifying them, thereby forming a synthetic quartz glass ingot, shaping, annealing, and effecting dehydrogenation treatment at a temperature of at least 600° C. and a pressure of up to 5 Pa for a holding time of at least 12 hours. The synthetic quartz glass has a high helium gas permeability and is suited for forming nanoimprint molds.

7 Claims, 2 Drawing Sheets

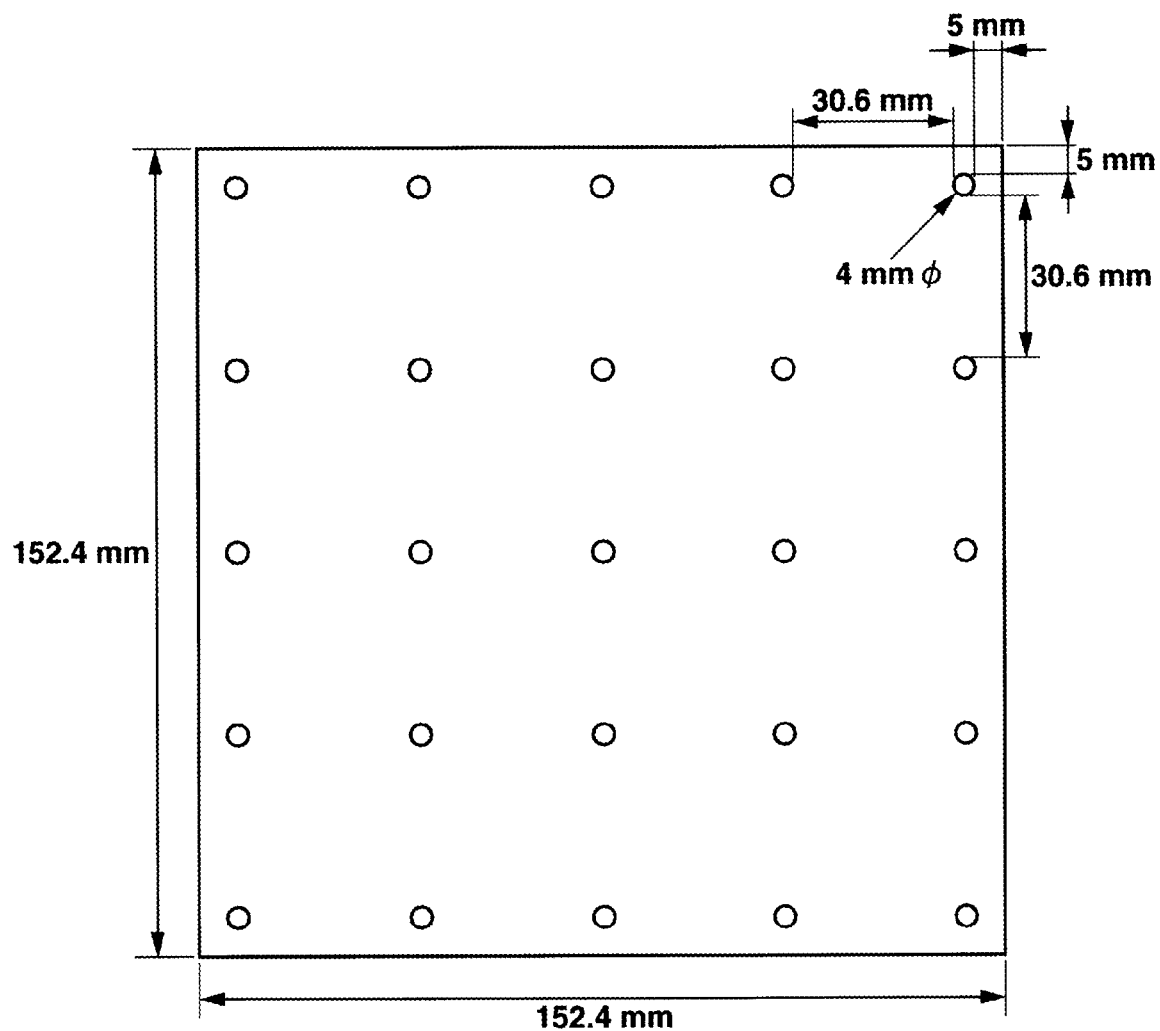

NANOIMPRINT MOLD-FORMING SYNTHETIC QUARTZ GLASS AND MAKING METHOD

CROSS-REFERENCE TO RELATED APPLICATION

This non-provisional application claims priority under 35 U.S.C. §119(a) on Patent Application No. 2012-154525 filed in Japan on Jul. 10, 2012, the entire contents of which are hereby incorporated by reference.

TECHNICAL FIELD

This invention relates to nanoimprint mold-forming synthetic quartz glass having a high gas permeability and a method of preparing the same.

BACKGROUND ART

As a need for semiconductor integrated circuits having a higher integration density is currently increasing, the lithography process for manufacturing semiconductor devices uses a light source of shorter wavelength. At present, the photolithography using ArF excimer laser (193 nm) is the mainstream. A future transition of photolithography to extreme ultraviolet (EUV) is regarded promising to gain a higher integration density. Like the photolithography, the nanoimprint technology is also in the limelight for the fabrication of semiconductor devices having a half pitch of 32 nm or less.

The nanoimprint technology is expected to find diversified applications of fabricating optical waveguides, biochips, and optical storage media. In the nanoimprint technology, a mold (also referred to as stamper or template) is engraved with a topological or fine pattern formed by EB exposure or etching technology. The mold is pressed to a resin material or resist layer coated on a substrate to transfer the fine pattern to the resin layer. In the fabrication of semiconductor devices, for example, the mold is pressed to a resist layer coated on a semiconductor wafer, typically silicon wafer to transfer the fine pattern to the resist layer.

In the step of pressing the mold to a resist layer on a recipient substrate to transfer the fine pattern to the resist layer, the mold must be pressed such that even fine recesses of the pattern over its entire extent may be filled with the resin material. If the resin material is incompletely spread, with air bubbles left, the fine pattern on the mold is not completely transferred.

For this reason, the transfer step is generally carried out in a least viscous gas atmosphere, for example, a helium-containing atmosphere so that no bubbles are left behind.

If the step of pressing the mold to a resin material is slowed down, residual bubbles may be minimized or eliminated. However, the slow step is one of barriers against the application of the nanoimprint technology to semiconductor fabrication because the semiconductor fabrication process requires to increase the throughput, that is, the number of processed units in a given time.

It is regarded effective for eliminating residual bubbles that helium gas in bubbles is absorbed and transmitted by the mold. While the nanoimprint mold is generally made of synthetic quartz glass having excellent light transmittance, thermal stability, mechanical properties and working properties, the glass has a low helium gas permeability and thus makes only a little contribution to throughput improvement.

Then WO 2011/096368 discloses a mold made of $TiO_2$—$SiO_2$ glass having a high helium gas permeability. The $TiO_2$—$SiO_2$ glass has the advantage that its light transmittance and thermal stability are equivalent or superior to synthetic quartz glass.

CITATION LIST

Patent Document 1: WO 2011/096368

DISCLOSURE OF INVENTION

However, the $TiO_2$—$SiO_2$ glass has problems including a negative impact on the fine pattern of irregularities of the mold due to striae and a high manufacture cost. There is a strong need for synthetic quartz glass having a high helium gas permeability.

An object of the invention is to provide synthetic quartz glass having a high helium gas permeability and suited for the nanoimprint technology and a method for preparing the same.

The inventors have found that a synthetic quartz glass having a hydroxyl group concentration of at least 300 ppm and a Raman peak attributable to hydrogen molecule equal to or less than the detection limit has a high helium gas permeability and is suited for forming nanoimprint molds.

In one aspect, the invention provides a method for preparing a synthetic quartz glass for forming nanoimprint molds, comprising the steps of subjecting a silicon-providing feedstock to flame hydrolysis in an oxyhydrogen flame to produce fine particles of silica, depositing the silica fine particles on a rotating quartz glass target while concurrently melting and vitrifying them, thereby forming a synthetic quartz glass ingot, shaping, annealing, and effecting dehydrogenation treatment by holding at a temperature of at least 600° C. and a pressure of up to 5 Pa for a time of at least 12 hours.

Preferably, the shaping step includes hot shaping at 1,500 to 1,800° C. for 1 to 10 hours, and the annealing step includes holding at a temperature of 1,050 to 1,300° C. for at least 5 hours and slowly cooling at a rate of up to 20° C./hr to a temperature of 800 to 1,000° C.

In another aspect, the invention provides a synthetic quartz glass for forming nanoimprint molds, having an OH group concentration of at least 300 ppm and a Raman peak attributable to hydrogen molecule equal to or less than the detection limit.

In preferred embodiments, the synthetic quartz glass has a birefringence of up to 8 nm/cm, a birefringence distribution of up to 5 nm/cm, a fictive temperature of up to 910° C., and/or a fictive temperature distribution of up to 10° C.

In a further aspect, the invention provides a synthetic quartz glass for forming nanoimprint molds, which is prepared by the method of the invention and has an OH group concentration of at least 300 ppm and a Raman peak attributable to hydrogen molecule equal to or less than the detection limit.

Also contemplated herein is a nanoimprint mold made of the synthetic quartz glass defined above.

ADVANTAGEOUS EFFECTS OF INVENTION

The synthetic quartz glass of the invention has a high helium gas permeability and is suited for forming nanoimprint molds.

BRIEF DESCRIPTION OF DRAWINGS

FIG. 2 is a plan view showing measurement spots on the surface of a glass substrate where physical properties are measured in Examples and Comparative Examples.

DESCRIPTION OF PREFERRED EMBODIMENTS

Figure 1:
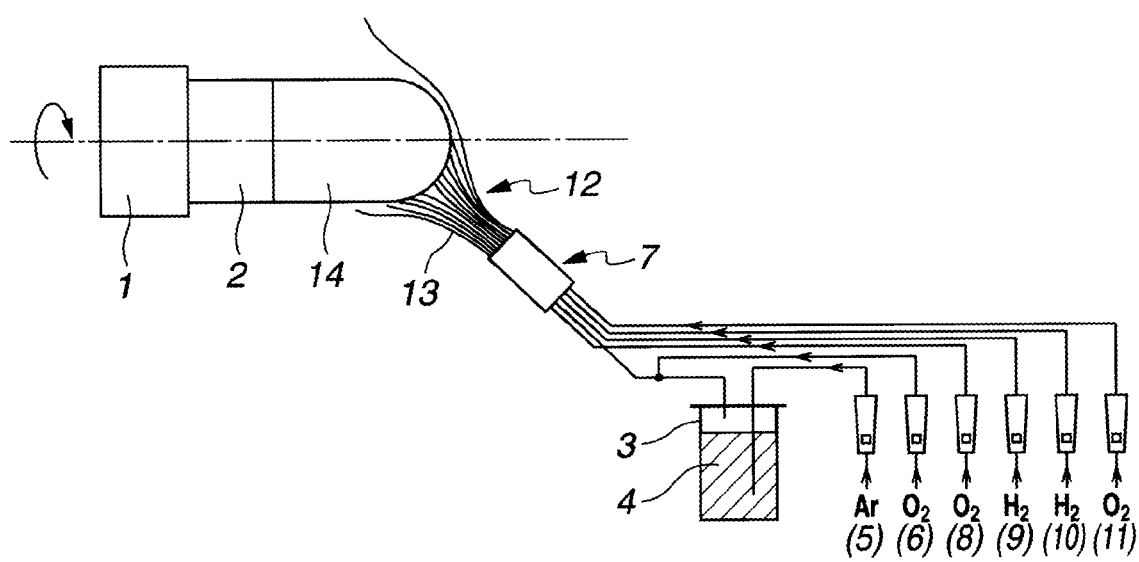
FIG. 1 schematically illustrates an exemplary apparatus for producing a synthetic quartz glass ingot.

The method for preparing synthetic quartz glass for forming nanoimprint molds according to the invention preferably follows the so-called direct process, specifically including the steps of feeding a combustible gas containing hydrogen gas and a combustion-supporting gas containing oxygen gas to a burner in a quartz glass manufacturing furnace and effecting combustion to form an oxyhydrogen flame at the burner tip, feeding a silicon-providing feedstock into the flame to subject the feedstock to oxidation or flame hydrolysis to produce fine particles of silica or silicon oxide, depositing the silica fine particles on a target disposed forward of the burner tip, and concurrently melting and vitrifying them into transparent glass, thereby forming a synthetic quartz glass ingot.

Referring to FIG. 1, there is illustrated an exemplary apparatus for producing a synthetic quartz glass ingot. A target 2 of quartz glass is mounted on a rotating support 1. A feedstock evaporator 3 is charged with a silicon-providing feedstock 4. An inert gas 5 such as argon is introduced into the feedstock 4 to carry the vapor of the silicon-providing feedstock 4 on the inert gas 5 (carrier). A quartz glass burner 7 includes a central nozzle which receives a gas mixture of the feedstock vapor 4 on carrier gas 5 with oxygen gas 6. The burner 7 also includes tubes surrounding the central nozzle, which receive oxygen gas 8, hydrogen gas 9, hydrogen gas 10, and oxygen gas 11, in the order from inside to outside. The silicon-providing feedstock gas 4 and oxyhydrogen flame 12 are injected from the burner 7 toward the target 2. Silica fine particles 13 are deposited on the target 2 while they are concurrently melted and vitrified, yielding a synthetic quartz glass ingot 14. According to the invention, the resulting ingot is hot shaped into a predetermined shape and annealed, yielding synthetic quartz glass for forming nanoimprint molds as will be described later.

Another method may be employed for the preparation of a synthetic quartz glass ingot. The other method includes the steps of feeding a combustible gas containing hydrogen gas and a combustion-supporting gas containing oxygen gas to a burner in a quartz glass manufacturing furnace and effecting combustion to form an oxyhydrogen flame, feeding a silicon-providing feedstock into the flame to produce fine particles of silica, spraying and depositing the silica fine particles on a rotating heat resistant substrate of quartz, axially withdrawing the substrate at a constant rate, thereby forming a porous silica sintered body, and heating the body in a water vapor atmosphere containing an inert gas for vitrification, thereby forming a synthetic quartz glass ingot.

Notably the quartz glass manufacturing furnace used herein may be either vertical or horizontal.

The silicon-providing feedstock used herein may comprise any well-known organosilicon compounds. Examples include chlorinated silane compounds such as silicon tetrachloride, dimethyldichlorosilane, and methyltrichlorosilane; and alkoxysilanes such as tetramethoxysilane, tetraethoxysilane, and methyltrimethoxysilane.

The combustible gas used herein is a hydrogen-containing gas, typically hydrogen gas, optionally in combination with another gas such as carbon monoxide, methane and propane. The combustion-supporting gas used herein is an oxygen-containing gas, typically oxygen gas.

The synthetic quartz glass ingot thus prepared is hot shaped into a predetermined shape, preferably at a temperature of 1,500 to 1,800° C., more preferably 1,600 to 1,750° C. for 1 to 10 hours.

The quartz glass ingot as hot shaped is annealed such that it may have a birefringence, birefringence distribution, fictive temperature and fictive temperature distribution in the desired ranges. Effective means for letting birefringence and birefringence distribution fall in the desired ranges is by holding in air or an inert gas atmosphere such as nitrogen at an anneal temperature of 1,050 to 1,300° C. for a time of preferably at least 5 hours, more preferably at least 10 hours, and even more preferably at least 15 hours, and slowly cooling down to a near-strain-point temperature of 800 to 1,000° C. at a rate of preferably up to 20° C./hr, more preferably up to 10° C./hr, and even more preferably up to 5° C./hr.

Effective means for letting fictive temperature and fictive temperature distribution fall in the desired ranges is by slowly cooling from 1,025° C. to 860° C. at a rate of preferably up to 3° C./hr, more preferably up to 2° C./hr, and even more preferably up to 1° C./hr, and optionally, but more effectively holding at 860° C. for at least 10 hours.

Further, the synthetic quartz glass as annealed is preferably heat treated so as to reduce the hydrogen molecule concentration to or below the detection limit. The heat treatment temperature is at least 600° C., preferably at least 700° C. The upper limit of heat treatment temperature is preferably up to 1,000° C., more preferably up to 900° C., and even preferably up to 850° C. The holding time is at least 12 hours, preferably at least 25 hours, more preferably at least 50 hours, and even more preferably at least 75 hours. The pressure is up to 5 Pa, preferably up to 2.5 Pa, and more preferably up to 1 Pa.

After the synthetic quartz glass is heat treated under reduced pressure, it is processed into a predetermined size by cutting, slicing, grinding or otherwise machining, and polished on a double-side polishing machine using a polishing slurry of silicon oxide, aluminum oxide, molybdenum oxide, silicon carbide, diamond, cerium oxide or colloidal silica, and further machined to produce a nanoimprint member.

The synthetic quartz glass of the invention is used as molds for the nanoimprint technology. The synthetic quartz glass should have a hydroxyl group concentration of at least 300 ppm, preferably at least 400 ppm. If the OH group concentration is less than 300 ppm, then synthetic quartz glass has a low helium gas permeability. Although the relationship of OH group concentration to helium gas permeability is not definitely recognized, it is believed that OH groups act in favor of pores in synthetic quartz glass through which helium gas permeates. It is also believed effective for providing affinity to resist that the glass contains OH groups in a concentration of at least 300 ppm. The upper limit of OH group concentration is up to 1,500 ppm, though not critical.

The OH group concentration is determined by infrared spectroscopy. Specifically, an extinction coefficient at a wavenumber of 4522 $cm^{-1}$ is measured by Fourier transform infrared spectrophotometry (FTIR), from which the OH group concentration is computed according to the conversion formula (1):

$$\text{OH group concentration (ppm)} = [(\text{extinction coefficient at } 4522\ cm^{-1})/T] \times 4400 \quad (1)$$

wherein T is a thickness (cm) of a sample.

Also, when analyzed by Raman spectroscopy, the synthetic quartz glass should have a peak attributable to hydrogen molecule equal to or less than the detection limit, that is, a hydrogen molecule concentration of up to $8.5 \times 10^{15}$ molecules/$cm^3$.

Herein, Raman spectroscopy analysis is carried out under the following conditions.
 instrument: NRS-2100 by JASCO Corp.
 laser: argon ion laser (power 7.5 W, wavelength 514 nm)
 Raman scattering mode: vertical scattering
 measurement mode: macro
 wavenumber range: 3900-4400 $cm^{-1}$ The hydrogen molecule concentration is measured by spectrophotometry as described in Zhurnal Priklandnoi Spektroskopii, Vol. 46, No. 6, 987-991 (June 1987). Specifically, the hydrogen molecule concentration in quartz glass is determined from a ratio of the intensity of hydrogen molecule at wavenumber 4135 cm$^{-1}$ for hydrogen molecules in quartz glass to the intensity of Raman band at wavenumber 800 cm$^{-1}$ for SiO$_2$. The hydrogen molecule concentration C is computed according to the following formula (2):

$$C=K(I_{4135}/I_{800}) \quad (2)$$

wherein K is a constant=1.22×10$^{21}$, I$_{4135}$ is an area intensity of Raman band at 4135 cm$^{-1}$, and I$_{800}$ is an area intensity of Raman band at 800 cm$^{-1}$.

To reduce the hydrogen molecule concentration in synthetic quartz glass to or below the detection limit, the glass is preferably heat treated under reduced pressure. The heat treatment temperature is at least 600° C., preferably at least 700° C. The upper limit of heat treatment temperature is preferably up to 1,000° C., more preferably up to 900° C., and even preferably up to 850° C. The holding time is at least 12 hours, preferably at least 25 hours, more preferably at least 50 hours, and even more preferably at least 75 hours. The upper limit of holding time is preferably up to 300 hours for economy, though not critical. The pressure is up to 5 Pa, preferably up to 2.5 Pa, and more preferably up to 1 Pa. The lower limit of pressure is preferably at least 0.01 Pa, though not critical.

The synthetic quartz glass should preferably have a birefringence of up to 8 nm/cm, more preferably up to 5 nm/cm, even more preferably up to 2 nm/cm, and most preferably up to 1 nm/cm. The birefringence distribution is preferably up to 5 nm/cm, more preferably up to 3 nm/cm. If birefringence exceeds 8 nm/cm or if birefringence distribution exceeds 5 nm/cm, then a fine pattern to be formed on a nanoimprint mold made of synthetic quartz glass may be deformed. Notably, the lower limits of birefringence and birefringence distribution are both preferably at least 0.01 nm/cm, though not critical.

In order to provide synthetic quartz glass with a birefringence of up to 8 nm/cm or a birefringence distribution of up to 5 nm/cm, the glass is annealed by holding in air or an inert gas atmosphere such as nitrogen at an anneal temperature of 1,050 to 1,300° C. for a time of preferably at least 5 hours, more preferably at least 10 hours, and even more preferably at least 15 hours, and slowly cooling down to a near-strain-point temperature of 800 to 1,000° C. at a rate of preferably up to 20° C./hr, more preferably up to 10° C./hr, and even more preferably up to 5° C./hr. This annealing schedule is effective for suppressing the birefringence and birefringence distribution in a shaped synthetic quartz glass block. Where it is desired to further reduce birefringence, the annealing at an adjusted cooling rate from the maximum temperature to the near-strain-point temperature is preferably followed by slow cooling from the near-strain-point temperature to a temperature in the range of 100 to 300° C. at a rate of up to 40° C./hr, more preferably up to 20° C./hr, and even more preferably up to 10° C./hr.

Birefringence is determined by a birefringence meter, for example, ABR-10A by UNIOPT Corp. The maximum of the measurements at a multiplicity of spots is reported as birefringence, and a difference between maximum and minimum is reported as birefringence distribution.

The synthetic quartz glass should preferably have a fictive temperature of up to 910° C., more preferably up to 900° C., and even more preferably up to 890° C. As used herein, the fictive temperature is the maximum of fictive temperature measurements in quartz glass at a multiplicity of spots. The fictive temperature distribution is preferably up to 10° C., more preferably up to 5° C. The fictive temperature distribution is a difference between maximum and minimum among fictive temperature measurements in quartz glass at a multiplicity of spots. If fictive temperature exceeds 910° C. or if fictive temperature distribution exceeds 10° C., then synthetic quartz glass may be less durable when used as nanoimprint molds.

In order that the synthetic quartz glass have a fictive temperature of up to 910° C. and a fictive temperature distribution of up to 10° C., the glass is preferably slowly cooled from 1,025° C. to 860° C. at a rate of up to 3° C./hr, more preferably up to 2° C./hr, and even more preferably up to 1° C./hr, and further preferably held at 860° C. for at least 10 hours. It is noted that the fictive temperature is measured by the method described in J. Non-Cryst. Solids 185, 191 (1995).

EXAMPLE

Examples of the invention are given below by way of illustration and not by way of limitation.

Example 1

Ingot Making Step

To a quartz glass burner as shown in FIG. 1, 2,800 g/hr of methyltrichlorosilane was fed while 13 Nm$^3$/hr of oxygen and 28 Nm$^3$/hr of hydrogen were fed to produce an oxyhydrogen flame. The silane was subjected to flame hydrolysis to form fine particles of silica, whereupon silica particles were deposited on a rotating quartz glass target and concurrently melted and vitrified. There was produced a synthetic quartz glass ingot having a diameter of 140 mm and a length of 350 mm.

[Shaping Step]

The glass ingot was ground on its surface by an external cylindrical grinder to remove the unmelted silica or soot stuck to the ingot surface. For surface cleaning, the ingot was immersed in a 50 wt % hydrofluoric acid solution for 3 hours, washed with deionized water, and dried in a clean booth.

The synthetic quartz glass ingot as surface-cleaned was placed in a high-purity carbon template having a high-purity carbon sheet set therein in an electric oven, and heated at a temperature of 1,780° C. in an argon gas atmosphere for 40 minutes, whereby it was shaped into a synthetic quartz glass body of 160 mm×160 mm×210 mm long. The shaped synthetic quartz glass body was sawed into a block of 50 mm thick. The shaped synthetic quartz glass block as sawed had a hydrogen molecule concentration of 6×10$^{18}$ molecules/cm$^3$ at the center and 3×10$^{18}$ molecules/cm$^3$ at the periphery.

[Annealing Step]

The shaped synthetic quartz glass block of 50 mm thick was placed in an atmospheric oven so that its surface of 160 mm×160 mm might face the built-in heater. The block was held at 1,145° C. for 15 hours, slowly cooled down to 1,025° C. at a rate of 5° C./hr, then slowly cooled down to 860° C. at a rate of 1° C./hr, held at 860° C. for 10 hours, and slowly cooled down to 150° C. at a rate of 10° C./hr. Finally, with the power supply to the heater turned off, it was allowed to cool down.

[Dehydrogenation Vacuum Heating Step]

The shaped synthetic quartz glass block as annealed was placed in a vacuum heating oven where it was held at 800° C. and 0.8 Pa for 75 hours for dehydrogenation.

[Substrate Preparing Step]

The shaped synthetic quartz glass block as dehydrogenated was sliced to a thickness of 6.8 mm and lapped. After the slice or substrate was lapped at its edge surfaces, it was roughly polished with a cerium oxide polishing slurry and then precision polished using an abrasive cloth of soft suede and a colloidal silica water dispersion having a SiO$_2$ concentration of 40 wt % as the polishing slurry. The polishing step was followed by cleaning and drying, yielding a polished substrate of 152.4 mm×152.4 mm×6.35 mm.

[Measurement of Physical Properties]

The polished substrate thus obtained was analyzed for OH group concentration, hydrogen molecule concentration, birefringence, and fictive temperature at a multiplicity of spots as shown in FIG. 2. Table 1 reports maximum, minimum and distribution value (Max−Min).

[Gas Permeability Test]

A polished silicon wafer was coated with a resist (MUR-XR01 by Maruzene Petrochemical Co., Ltd.) in a dotted pattern. At this point, only a central portion of the silicon wafer was not coated with the resist. The polished synthetic quartz glass substrate was brought close to the silicon wafer from top and held to maintain a constant distance between the glass substrate and the silicon wafer. Bubbles having a diameter of about 100 µm were formed at the central portion of the silicon wafer and glass substrate where no resist was coated. A time passed until the bubbles extinguished was measured. The bubble extinction time is also shown in Table 1. It is noted that the gas permeability test was performed in a chamber filled with helium gas.

Example 2

Dehydrogenation Vacuum Heating Step

The shaped synthetic quartz glass block of 50 mm thick as annealed was placed in a vacuum heating oven where it was held at 600° C. and 2.5 Pa for 12 hours to carry out dehydrogenation. The process was the same as in Example 1 except the dehydrogenation vacuum heating step. The results of measurement and gas permeability test are also shown in Table 1.

Example 3

Ingot Making Step

To a quartz glass burner as shown in FIG. 1, 2,650 g/hr of methyltrichlorosilane was fed while 10 Nm$^3$/hr of oxygen and 23 Nm$^3$/hr of hydrogen were fed to produce an oxyhydrogen flame. The silane was subjected to flame hydrolysis to form fine particles of silica, whereupon silica particles were deposited on a rotating quartz target and concurrently melted and vitrified. There was produced a synthetic quartz glass ingot having a diameter of 140 mm and a length of 350 mm.

The process was the same as in Example 1 except the ingot making step. The results of measurement and gas permeability test are also shown in Table 1.

Comparative Example 1

Dehydrogenation Vacuum Heating Step

The shaped synthetic quartz glass block of 50 mm thick as annealed was placed in a vacuum heating oven where it was held at 400° C. and 1.0 Pa for 25 hours to carry out dehydrogenation. The process was the same as in Example 1 except the dehydrogenation vacuum heating step. The results of measurement and gas permeability test are also shown in Table 1.

Comparative Example 2

Ingot Making Step

To a quartz multi-tube burner, 6 Nm$^3$/hr of oxygen and 5 Nm$^3$/hr of hydrogen were fed to produce an oxyhydrogen flame while 1,000 g/hr of methyltrichlorosilane was fed into the flame. The silane was subjected to flame hydrolysis to form fine particles of silica, whereupon silica particles were sprayed onto a heat resistant quartz substrate rotating at 20 rpm. The substrate was axially withdrawn at a constant speed, obtaining a porous silica sintered body having a diameter of 300 mm and a length of 1,000 mm. The porous silica sintered body was placed in a vacuum heating oven under a pressure below 0.3 Pa where it was heated from room temperature to 1,250° C. at a rate of 10° C./hr, held at the temperature for 10 hours, and heated from 1,250° C. to 1,500° C. at a rate of 3° C./hr for transparent glass conversion, yielding a synthetic quartz glass body having a diameter of 140 mm and a length of 350 mm.

The process was the same as in Example 1 except the ingot making step. The results of measurement and gas permeability test are also shown in Table 1.

Comparative Example 3

Ingot Making Step

To a quartz multi-tube burner, 6 Nm$^3$/hr of oxygen and 5 Nm$^3$/hr of hydrogen were fed to produce an oxyhydrogen flame while 1,000 g/hr of methyltrichlorosilane was fed into the flame. The silane was subjected to flame hydrolysis to form fine particles of silica, whereupon silica particles were sprayed onto a heat resistant quartz substrate rotating at 20 rpm. The substrate was axially withdrawn at a constant speed, obtaining a porous silica sintered body having a diameter of 300 mm and a length of 1,000 mm. The porous silica sintered body was placed in an atmosphere of 95 vol % helium gas and 5 vol % water vapor where it was heated from room temperature to 1,250° C. at a rate of 10° C./hr, held at the temperature for 10 hours, and heated from 1,250° C. to 1,500° C. at a rate of 3° C./hr for transparent glass conversion, yielding a synthetic quartz glass body having a diameter of 140 mm and a length of 350 mm.

The process was the same as in Example 1 except the ingot making step. The results of measurement and gas permeability test are also shown in Table 1.

TABLE 1

| | Hydrogen molecule concentration ($\times 10^{17}$ molecules/cm$^3$) | | OH group concentration (ppm) | | Birefringence (nm/cm) | | | Fictive temperature (° C.) | | | Gas permeability |
|---|---|---|---|---|---|---|---|---|---|---|---|
| | | | | | | | Distribution | | | Distribution | |
| | Max | Min | Max | Min | Max | Min | value | Max | Min | value | (sec) |
| Example | | | | | | | | | | | |
| 1 | N.D. | — | 467 | 433 | 0.9 | 0.7 | 0.2 | 875 | 872 | 3 | 23 |
| 2 | N.D. | — | 489 | 450 | 1.4 | 0.7 | 0.7 | 872 | 870 | 2 | 29 |
| 3 | N.D. | — | 335 | 308 | 1.2 | 0.9 | 0.3 | 892 | 885 | 7 | 26 |

TABLE 1-continued

| | Hydrogen molecule concentration (×10$^{17}$ molecules/cm$^3$) | | OH group concentration (ppm) | | Birefringence (nm/cm) | | | Fictive temperature (° C.) | | | Gas permeability |
|---|---|---|---|---|---|---|---|---|---|---|---|
| | | | | | | | Distribution | | | Distribution | |
| | Max | Min | Max | Min | Max | Min | value | Max | Min | value | (sec) |
| Comparative Example | | | | | | | | | | | |
| 1 | 3.2 | 1.4 | 469 | 439 | 1.3 | 0.8 | 0.5 | 869 | 865 | 4 | 54 |
| 2 | N.D. | — | 62 | 60 | 2.5 | 0.7 | 1.8 | 895 | 892 | 3 | 35 |
| 3 | N.D. | — | 288 | 261 | 3.1 | 1.9 | 1.2 | 902 | 897 | 5 | 37 |

N.D.: not detected

Japanese Patent Application No. 2012-154525 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a synthetic quartz glass for forming nanoimprint molds, comprising the steps of
subjecting a silicon-providing feedstock to flame hydrolysis in an oxyhydrogen flame to produce fine particles consisting of silica,
depositing the silica fine particles on a rotating quartz glass target while concurrently melting and vitrifying them, thereby forming a synthetic quartz glass ingot,
shaping, annealing, and effecting dehydrogenation treatment by holding at a temperature of at least 600° C. and a pressure of up to 5 Pa for a time of at least 12 hours,
thereby obtaining a synthetic quartz glass having an OH group concentration of 300 to 489 ppm and a Raman peak attributable to hydrogen molecule equal to or less than the detection limit which is a hydrogen molecule concentration of up to 8.5×10$^{15}$ molecules/cm$^3$.

2. The method of claim 1 wherein the shaping step includes hot shaping at 1,500 to 1,800° C. for 1 to 10 hours, and the annealing step includes holding at a temperature of 1,050 to 1,300° C. for at least 5 hours and slowly cooling at a rate of up to 20° C./hr to a temperature of 800 to 1,000° C.

3. A synthetic quartz glass for forming nanoimprint molds, having an OH group concentration of 300 to 489 ppm, a Raman peak attributable to hydrogen molecule equal to or less than the detection limit which is a hydrogen molecule concentration of up to 8.5×10$^{15}$ molecules/cm$^3$, a fictive temperature of up to 890° C., and a fictive temperature distribution of up to 10° C.

4. The synthetic quartz glass of claim 3, having a birefringence of up to 8 nm/cm.

5. The synthetic quartz glass of claim 3, having a birefringence distribution of up to 5 nm/cm.

6. A synthetic quartz glass for forming nanoimprint molds, prepared by the method of claim 1 and having an OH group concentration of 300 to 489 ppm and a Raman peak attributable to hydrogen molecule equal to or less than the detection limit which is a hydrogen molecule concentration of up to 8.5×10$^{15}$ molecules/cm$^3$.

7. A nanoimprint mold made of the synthetic quartz glass of claim 3.

* * * * *